United States Patent [19]

Boddie et al.

[11] Patent Number: 4,539,635
[45] Date of Patent: Sep. 3, 1985

[54] PIPELINED DIGITAL PROCESSOR ARRANGED FOR CONDITIONAL OPERATION

[75] Inventors: James R. Boddie, Hazlet; John S. Thompson, Tinton Falls, both of N.J.

[73] Assignee: AT&T Bell Laboratories, Murray Hill, N.J.

[21] Appl. No.: 401,350

[22] Filed: Jul. 23, 1982

Related U.S. Application Data

[63] Continuation-in-part of Ser. No. 120,059, Feb. 11, 1980, abandoned.

[51] Int. Cl.³ .............................................. G06F 7/38
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,401,376 | 9/1968 | Barnes | 364/200 |
| 3,577,190 | 5/1971 | Cocke et al. | 364/200 |
| 3,771,138 | 11/1973 | Celtruda | 364/200 |
| 3,840,861 | 10/1974 | Amdahl | 364/200 |
| 3,875,391 | 4/1975 | Shapiro | 364/200 |
| 4,075,688 | 2/1978 | Lynch | 364/200 |

OTHER PUBLICATIONS

IBM Journal of R and D, "The IBM Sys/360 Model 91: Machine Philosophy and Instr-Handling", pp. 8–24, 1/1967.
Intel 2920 Assembly Language Manual, 1979, pp. i and 3–8.

Primary Examiner—James D. Thomas
Assistant Examiner—David Y. Eng
Attorney, Agent, or Firm—Richard B. Havill

[57] ABSTRACT

A pipelined digital processor includes a common data and control bus and a source (100 or 105) of instructions and data words. An arithmetic section (110) processes one data word with another data word through selected processing subsections (112, 115, 116) performing operations according to an expression, thereby producing a resultant data word and a status signal. A destination (105) receives the resultant data word from the arithmetic section. Control circuits (IR-C) decode a single conditional instruction for controlling performance of a specific condition test during a first subsequent processor cycle (i.e., i+2). The control circuits further decoding another instruction word during the first subsequent processor cycle for controlling all processing sections operations during a second subsequent processor cycle (i.e., i+3). A circuit (215 and 122) compares the status signal with the specific condition information included in the conditional instruction for selectively disabling at least one section while enabling at least one other section of the digital processor during the second subsequent processor cycle.

3 Claims, 10 Drawing Figures

FIG. 4

| PROCESSOR CYCLE | i+1 | | i+2 | | | | i+3 |
|---|---|---|---|---|---|---|---|
| MACHINE STATE | 2 | 3 | 0 | 1 | 2 | 3 | 0 |
| COMMON DATA AND CONTROL BUS USAGE | READ RAM OR I/O TO REG Y | READ ROM TO IR | WRITE ROUNDED OUTPUT $w_{i+1}$ OR VARIABLE $y_{i+1}$ TO RAM OR I/O | READ ROM, RAM, OR I/O TO REG X OR READ ROM TO IR | READ RAM OR I/O TO REG Y | READ ROM TO IR | WRITE ROUNDED OUTPUT $w_{i+2}$ OR VARIABLE $y_{i+2}$ TO RAM OR I/O |
| CONTROLLED BY | $I_{i-2}(t)$ | AUTOMATIC | $I_i(s)$ | $I_{i-1}(s,t)$ | $I_{i-1}(t)$ | AUTOMATIC | $I_{i+1}(s)$ |
| ADDRESS BUS USAGE | CONTENTS OF REG PC OR REG RX | CONTENTS OF REG RY | CONTENTS OF REG PC | CONTENTS OF REG RD OR REG RX | CONTENTS OF REG PC OR REG RX | CONTENTS OF REG RY | CONTENTS OF REG PC |
| CONTROLLED BY | $I_{i-1}(t)$ | $I_{i-1}(t)$ | AUTOMATIC | $I_i(s,t)$ | $I_i(t)$ | $I_{i+1}(t)$ | AUTOMATIC |

FIG. 7

| FIG. 5 | FIG. 6 |
|---|---|

FIG. 5

| PROCESSOR CYCLE | i-3 | i-2 | i-1 | i | TO FIG. 6 |
|---|---|---|---|---|---|
| FETCHING FROM MEMORY AND STORING IN MEMORY | $I_{i-3}(l,m,n,s,t)$<br>$x_{i-3}"$<br>$y_{i-3}"$<br>$M_{i-3}"$ | $I_{i-2}$<br>$x_{i-2}"$<br>$y_{i-2}"$<br>$M_{i-3}"$ | $I_{i-1}(l,m,n,s,t)$<br>$x_{i-1}"$<br>$y_{i-1}"$<br>$M_{i-1}"$ | $I_i(l,m,n,s,t)$<br>$x_i = f(M_{i-1}, u_{i-2}, I_{i-3}(t))$<br>$y_i = f(M_{i-1}, u_{i-2}, I_{i-3}(t))$<br>$M_i = f(M_{i-1}, u_{i-1}, w_{i-1}, I_{i-2}(s))$ | |
| DECODING INSTRUCTIONS | $I_{i-4}$ | $I_{i-3}(l,m,n,s,t)$ | $I_{i-2}$ | $I_{i-1}(l,m,n,s,t)$ | |
| COMPUTING PRODUCTS | $p_{i-3}"$ | $p_{i-2}"$ | $p_{i-1}"$ | $p_i"$ | |
| ACCUMULATING RESULT | $a_{i-3}"$ | $a_{i-2}"$ | $a_{i-1}"$ | $a_i"$ | |
| ROUNDING OUTPUT | $w_{i-3}"$ | $w_{i-2}"$ | $w_{i-1}"$ | $w_i"$ | |
| MODIFYING ADDRESSES | $u_{i-3}"$ | $u_{i-2}"$ | $u_{i-1} = f(u_{i-2}, I_{i-3}(s,t))$ | $u_i"$ | |

FIG. 6

| | i+1 | i+2 | i+3 | i+4 |
|---|---|---|---|---|
| | $I_{i+1}(l,m,n,s,t)$<br>$x_{i+1} = f(M_i, u_{i-1}, I_{i-2}(t))$<br>$y_{i+1} = f(M_i, u_{i-1}, I_{i-2}(t))$<br>$M_{i+1} = f(M_i, u_i, w_i, I_{i-1}(s))$ | $I_{i+2}(l,m,n,s,t)$<br>$x_{i+2} = f(M_{i+1}, u_i, I_{i-1}(t))$<br>$y_{i+2} = f(M_{i+1}, u_i, I_{i-1}(t))$<br>$M_{i+2} = f(M_{i+1}, u_{i+1}, w_{i+1}, I_i(s))$ | $I_{i+3}(l,m,n,s,t)$<br>$x_{i+3} = f(M_{i+2}, u_{i+1}, I_i(t))$<br>$y_{i+3} = f(M_{i+2}, u_{i+1}, I_i(t))$<br>$M_{i+3} = f(M_{i+2}, u_{i+2}, w_{i+2}, I_{i+1}(s))$ | $I_{i+4}(l,m,n,s,t)$<br>$x_{i+4} = f(M_{i+3}, u_{i+2}, I_{i+1}(t))$<br>$y_{i+4} = f(M_{i+3}, u_{i+2}, I_{i+1}(t))$<br>$M_{i+4} = f(M_{i+3}, u_{i+3}, w_{i+3}, I_{i+2}(s))$ |
| | $I_i(l,m,n,s,t)$<br>$I_1(l,m,n,s,t)$ | $I_{i+1}(l,m,n,s,t)$<br>$I_2(l,m,n,s,t)$ | $I_{i+2}(l,m,n,s,t)$ | $I_{i+3}$ |
| | $p_{i+1} = f(x_i, y_i, I_{i-1}(l))$<br>$p_2 \quad x_1 y_1 I_0(l)$ | $p_{i+2} = f(x_{i+1}, y_{i+1}, I_i(l))$<br>$p_3 \quad x_2 \quad y_2 \quad I_1(l)$ | $p_{i+3} = f(x_{i+2}, y_{i+2}, I_{i+1}(l))$<br>$p_4 \quad x_3 \quad y_3 \quad I_2(l)$ | $p_{i+4}"$ |
| | $a_{i+1} = f(q_i, p_i, I_{i-1}(m))$ | $a_{i+2} = f(q_{i+1}, p_{i+1}, I_i(m))$<br>$a_3 \quad a_2 \quad p_2 \quad I_1(m)$ | $a_{i+3} = f(q_{i+2}, p_{i+2}, I_{i+1}(m))$<br>$a_4 \quad a_3 \quad p_3 \quad I_2(m)$ | $a_{i+4}"$ |
| | $w_{i+1} = f(w_i, a_i, I_{i-1}(n))$ | $w_{i+2} = f(w_{i+1}, a_{i+1}, I_i(n))$ | $w_{i+3} = f(w_{i+2}, a_{i+2}, I_{i+1}(n))$ | $w_{i+4}"$ |
| | $u_{i+1} = f(u_i, I_{i-1}(s,t))$ | $u_{i+2} = f(u_{i+1}, I_i(s,t))$ | $u_{i+3}"$ | $u_{i+4} = f(u_{i+3}, I_{i+2}(s,t))$ |

(FROM FIG. 5)

*FIG. 8*

| PROCESSOR CYCLE | i | i+1 / 2 | i+2 / 3 | i+3 |
|---|---|---|---|---|
| FETCHING FROM MEMORY AND STORING IN MEMORY | $I_i(c,s,t)$<br>$x_i$″<br>$y_i$″<br>$M_i$″ | $I_{i+1}(l,m,n,s,t)$<br>$x_{i+1}$″<br>$y_{i+1}$″<br>$M_{i+1}$″ | $I_{i+2}$″<br>$x_{i+2}=f(M_{i+1},u_i,I_{i-1}(t))$<br>$y_{i+2}=f(M_{i+1},u_i,I_{i-1}(t))$<br>$M_{i+2}=f(M_{i+1},u_i,I_{i+1},W_{i+1},I_i(s))$ | $I_{i+3}$″<br>$x_{i+3}=f(M_{i+2},u_{i+1},I_i(t))$<br>$y_{i+3}=f(M_{i+2},u_{i+1},I_i(t))$<br>$M_{i+3}=f(M_{i+2},u_{i+2},W_{i+2},I_{i+1}(s),I_i(c),V_{i+2})$ |
| DECODING INSTRUCTIONS | $I_{i-1}$ | $I_i(c,s,t)$<br>$I_1$ | $I_{i+1}(l,m,n,s,t)$<br>$I_2$ | $I_{i+2}$ |
| COMPUTING PRODUCTS | $p_i$″ | $p_{i+1}$″ | $p_{i+2}=p_{i+1}$ | $p_{i+3}=f(x_{i+2},y_{i+2},I_{i+1}(l),I_i(c),V_{i+2}p_{i+2})$ |
| ACCUMULATING RESULT | $a_i$″ | $a_{i+1}$″ | $a_{i+2}=a_{i+1}$ | $a_{i+3}=f(a_{i+2},p_{i+2},I_{i+1}(m),I_i(c),V_{i+2})$ |
| ROUNDING OUTPUT | $w_i$″ | $w_{i+1}$″ | $w_{i+2}=w_{i+1}$ | $w_{i+3}=f(w_{i+2},a_{i+2},I_{i+1}(n),I_i(c),V_{i+2})$ |
| MODIFYING ADDRESSES | $u_i$″ | $u_{i+1}$″ | $u_{i+2}=f(u_{i+1},I_i(s,t))$ | $u_{i+3}=f(u_{i+2},I_{i+1}(s,t),I_i(c),V_{i+2},x_{i+2})$ |

PIPELINED DIGITAL PROCESSOR ARRANGED FOR CONDITIONAL OPERATION

This is a continuation-in-part of application, Ser. No. 120,059, filed Feb. 11, 1980 now abandoned.

BACKGROUND OF THE INVENTION

The invention relates to a pipelined digital processor which is described more particularly as a processor arranged for conditional operations.

Stored program control digital computers typically include a memory, input-output circuitry, a controller and arithmetic section. The memory provides a source for a computer program and data to be operated on by the arithmetic section. The arithmetic section includes circuits which provide means for manipulating data in a predetermined manner. The controller provides control signals for regulating timing and transfers of data to be operated upon. The input-output circuitry provides means for transferring information between the computer and external devices. Some operations of the computer may be conditioned upon flags, or conditions, existing as a result of prior operations or other events.

To increase computational speed, some digital computers are arranged for pipelined operation. In a pipelined operation the arithmetic unit, or section, includes a collection of specialized circuits capable of working simultaneously but altogether forming a general purpose organization. These specialized circuits operate independently, each performing a specific task in a general purpose procedure. The pipelined operation divides a process into several subprocesses which are executed by the individual specialized circuits. Successive ones of the subprocesses are carried out in an overlapped mode analogous to an industrial assembly line. New operands are applied at the input to the arithmetic section during each cycle. Different subsections of the arithmetic section perform their tasks in sequential order during subsequent cycles. A resultant is produced each cycle. Each specialized circuit performs its own task at the cyclic rate.

Control of a pipelined computer, or processor, presents particularly perplexing problems when operations are to be executed conditionally because instructions become stacked up in the pipeline during steady-state operation.

Heretofore a pipelined digital processor has been designed to transfer data words and instructions from memory to the arithmetic section and a control section in respective pipelined streams. These streams of data words and instruction words fill pipelines of circuits within the processor. As long as the processor operates normally, the pipelines of information are processed step by step through sections of the processor in a cyclical operation.

A problem arises, however, when an operation must be executed conditionally. Typically this operation is realized by a conditional transfer that causes execution of one of two alternative sequences of one or more instructions. Since one of these sequences of instructions is in the processor pipeline when the condition is tested, it may be necessary to abort execution of that sequence and start to fill the pipeline for execution of the alternative sequence. Processing time is lost whenever this alternate sequence is invoked.

SUMMARY OF THE INVENTION

This problem is solved in an exemplary pipelined digital processor arranged for conditional operation. The processor includes a source of instructions and data words. An arithmetic section processes one data word with another data word through selected processing subsections performing operations according to an expression, thereby producing a resultant data word. A destination receives the resultant data word from the arithmetic section. Control circuits decode a single conditional instruction word for controlling performance of a specific condition test during a first subsequent processor cycle. The control circuits further decoding another instruction word during the first subsequent processor cycle for controlling all processing sections operations during a second subsequent processor cycle. The specific condition test is performed by a circuit which compares conditions existing in the digital processor during the first subsequent processor cycle with information included in the conditional instruction for selectively disabling control of at least one section of the processor during the second subsequent processor cycle.

BRIEF DESCRIPTION OF THE DRAWINGS

A better understanding of the invention will be reached by reading the subsequent detailed description with reference to the drawings wherein FIGS. 1 and 2 when positioned as shown in FIG. 3 form a block diagram of a pipelined digital signal processor;

FIG. 4 is a timing diagram;

FIGS. 5 and 6, when positioned as shown in FIG. 7, form a processor function chart;

FIG. 8 is a processor function chart for a conditional operation;

DETAILED DESCRIPTION

Figure 1:
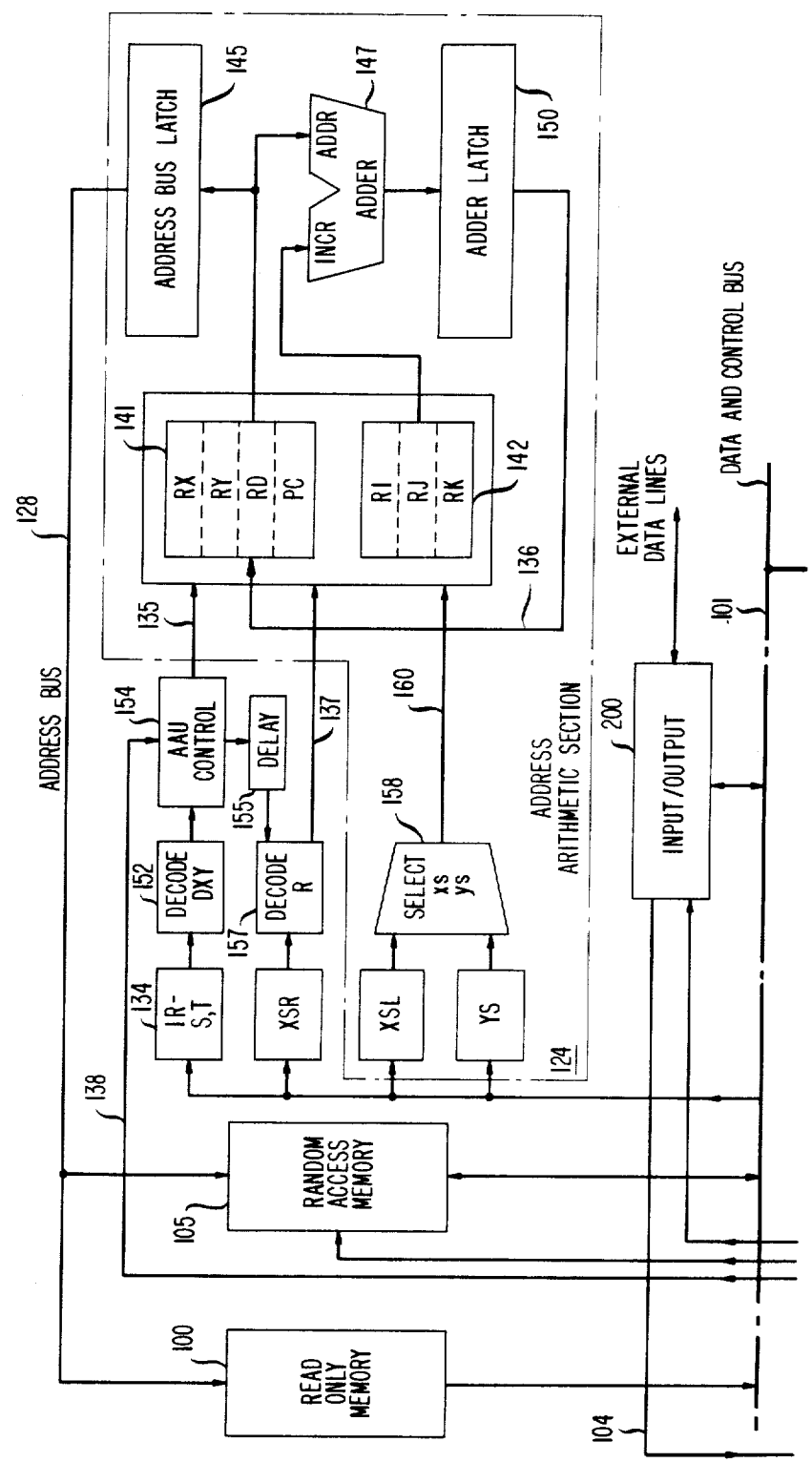
Figure 2:
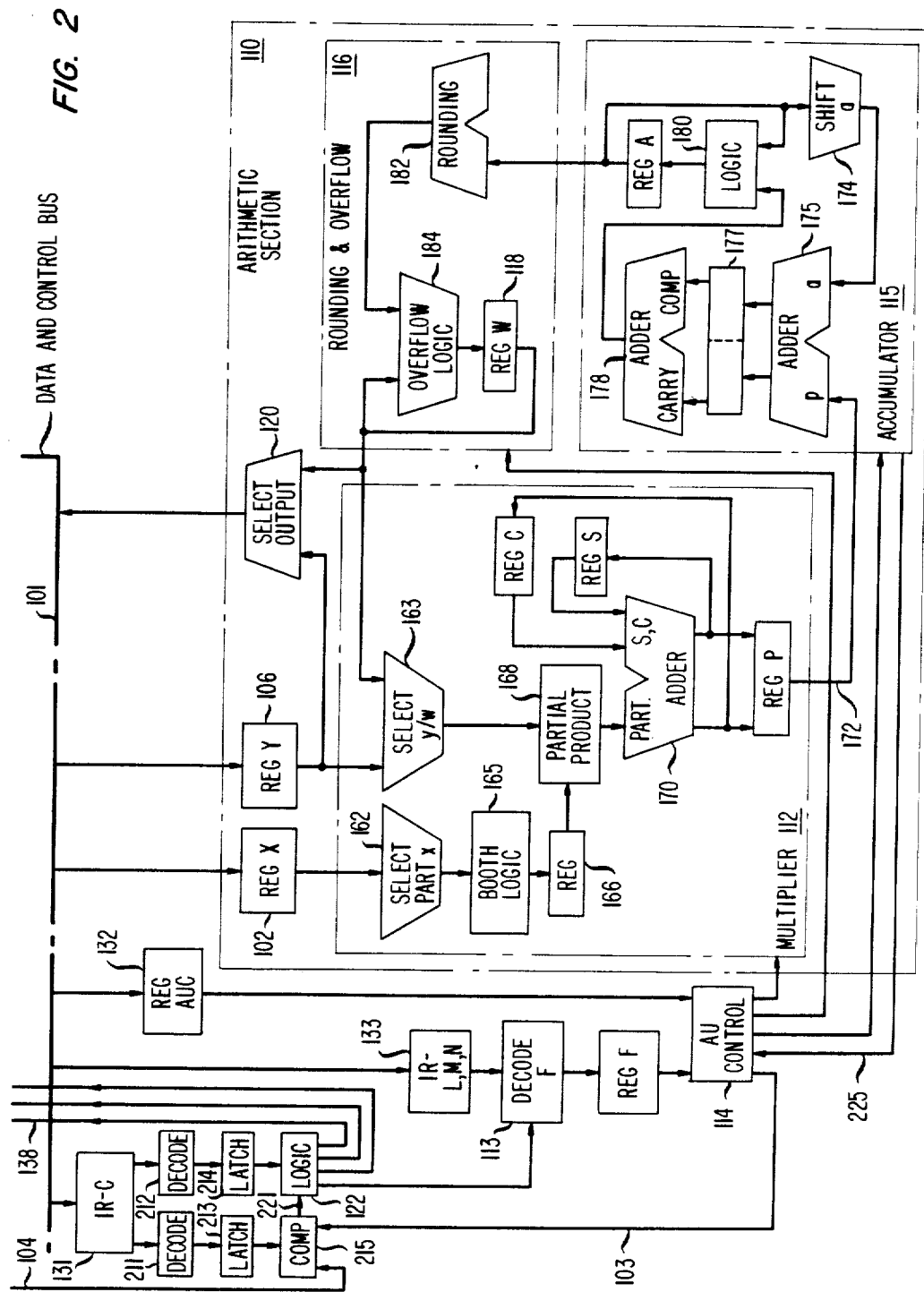

Referring now to FIGS. 1 and 2, there is shown the overall architecture of a pipelined digital signal processor.

A read only memory 100 stores instructions and fixed data words. Instructions are transferred from the read only memory by way of a common data and control bus 101 to instruction registers IR-C, IR-L,M,N, and IR-S,T. Parts of instructions are distributed to the instruction registers. Fixed data words, or coefficient words, are transferred from the read only memory by way of the common data and control bus 101 to a coefficient register 102. The register 102 is labelled REG X because the coefficients are identified hereinafter by the symbol x.

A random access memory 105 stores variable data words which may be stored therein either from an external source or from the output of the arithmetic section of this processor. The variable data words are transferred from the random access memory by way of the common data and control bus 101 to a variable data register 106. The register 106 is labelled REG Y because variable data words are identified hereinafter by the symbol y. By choice of the user, the random access memory may store coefficients used in place of fixed data words as well as the variable data words.

Registers 102 and 106, respectively, store a sequential stream of coefficient words and variable data words which are operands applied as inputs to an arithmetic section 110. These sequences of operands are processed in a pipeline fashion through a multiplier subsection 112, an accumulator subsection 115 and a rounding and overflow circuit subsection 116. A rounded output word is produced in a register 118 that is labelled REG W because rounded output words are identified by the symbol w hereinafter.

An output selector circuit 120 is included within the arithmetic section for choosing as an output word from the arithmetic section to the data bus 101 either the variable data word y stored in register 106 or the rounded output word w stored in register 118. The rounded output word w is a resultant of some process performed by the arithmetic section. The chosen output word can be transferred from either the register 106 or the register 118 by way of the common data and control bus 101 to a writeable destination, such as in the random access memory 105.

As previously mentioned, instructions for the digital signal processor are stored in read only memory 100. During the fourth machine state of each processor cycle, shown in FIG. 4, a single instruction automatically is read out of read only memory from a location having an address produced by an address arithmetic unit, or section, 124. The address from a program counter register PC in the address arithmetic section is applied by way of an address bus latch 145 and an address bus 128 to the address circuitry of the read only memory. Read only memory responds during each processor cycle by sending the single instruction thus fetched by way of the common data and control bus to the various control field, or instruction, registers IR-C, IR-L,M,N and IR-S,T associated with different sections of the processor. Registers IR-C and IR-L,M,N receive the same information concurrently.

Each instruction, or opcode, used in the digital signal processor includes a plurality of control fields, or control messages, each of which is given a designation such as l, m, n, s and t to be used hereinafter. The control field register IR-L,M,N associated with arithmetic section 110 receives some of the fields, such as instruction fields l, m and n, respectively associated with control of multiplying, accumulating and rounding operations. The control field register IR-S,T, associated with the address arithmetic section 124, receives instruction fields s and t which relate to control of address register modification for controlling the fetching of operands x and y and the storing of the output word chosen by the selector circuit 120.

The address arithmetic section 124 includes two sets of registers 141 and 142, the address bus latch 145, an adder 147 and an adder latch 150 interconnected by some busses.

One set of registers 141, including registers RX, RY, RD and PC, is arranged to store memory addresses. An address stored in register RX can be used for accessing a coefficient word stored in a location in either random access memory or read only memory. An address stored in register RY can be used only for accessing a variable data word stored in a location in random access memory. An address stored in the register RD can be used for writing a resultant data word into a destination, such as a location in a random access memory. An address stored in the program counter register PC is used for accessing the next instruction or fixed data word from the read only memory.

The second set of registers 142 is arranged to store variable increment values to be used for incrementing automatically addresses stored in registers RX, RY and RD. Alternatively, the stored addresses may be incremented by one of a set of fixed value increments.

Operations of the digital signal processor are controlled by two types of instructions. Normal instructions are used most of the time. They control the performance of arithmetic operations during signal processing. Another type of instruction, used occasionally, is called an auxiliary instruction. One specific auxiliary instruction controls the loading of an address register or an address increment register in the address arithmetic section.

It is assumed that a start up sequence of instructions is stored in the read only memory starting at an initial address and that a reset circuit sets the program counter register PC to the initial address. Following the reset operation, typically there is a sequence of instructions for storing additional addresses in the address registers RX, RY and RD and increment values in increment registers RI, RJ and RK. These registers are set by auxiliary instructions. Ordinarily the values stored in the registers RI, RJ and RK are retained therein throughout a program while the values in the registers RX, RY and RD are modified from time to time during the execution of a sequence of normal instructions.

After the processor is reset and the address and increment values stored, the processor can run a valid program for processing digital signals. Most of the instructions used for processing signals are normal arithmetic instructions.

Information in each of the registers RX, RY, RD, PC, RI, RJ and RK can be set to any specific value by an auxiliary instruction. For example, a first instruction to load address register RY specifies that some processor register is to be loaded or set.

In this first instruction, a control field c contains the required information. This control field c is stored in an instruction register IR-C during the instruction fetch cycle.

A fixed data word, associated with the first instruction and loaded into the address arithmetic section 124 during the processor cycle in which that instruction is decoded, provides information identifying which address register is to be loaded and fixing the increment value to be loaded. The control field and value field are transferred from memory by way of the common data and control bus 101 to the control field register XSR and the value field register XSL.

While the first instruction is being executed, the control field in the register XSR is decoded in a decoder 157 to select the proper address register. From register XSL the value to be loaded into the address register RY is applied to the registers 141 and 142 through a selector circuit 158 and a bus 160 in the execution cycle of the first instruction.

A second instruction to load increment register RI specifies that a processor register is to be loaded or set. As in the just described example of setting the address register RY, a fixed data word similarly associated with the second instruction provides a control field to identify the register to be set and a value field to establish the value to be loaded. The fields of the fixed data word are applied from the register XSR through the decoder 157 and the bus 137 to determine the increment register selected in the set of registers 142 and from the register XSL through selector 158 and bus 160 to establish the value to be loaded in the selected increment register during the execution cycle of the second instruction.

During the processing of both normal and auxiliary instructions, control fields s and t from the instructions are stored in the instruction register IR-S, T when that instruction is fetched. These fields to be processed are decoded in a decoder 152 during the next processor cycle with the decoded information being latched in an AAU control circuit 154. This decoded information is applied over a bus 135 to the sets of registers 141 and 142 during the instruction execute cycle, or second processor cycle, after the fetch. Both an address register and an increment register or a fixed increment are selected by the information on bus 135. The address is applied to the address bus latch 145 and to the input of an adder 147. The increment value simultaneously is applied to the other input of the adder 147, which increments the address and stores it for one machine state in an adder latch 150. During the following machine state, the incremented address is applied by way of a bus 136 to the set of address registers 141.

Simultaneously during the processing of a normal instruction, part of the information in the fields s and t is applied through a single machine state delay in a delay circuit 155. This delayed information provides selection information for determining which of the address registers 141 is to be written after the just described addressing operation. In the following machine state, the delayed information is decoded in a decoder 157 and applied over a bus 137 to the address registers 141. At this time, the incremented address stored in the adder latch 150 is written into the selected address register thus post modifying the address.

During the processing of an auxiliary register set instruction, the above described operation for writing a post modified address back into an address register may be preempted by the register set operation. Preempting is accomplished by the decoder 157 in response to information applied from logic circuit 122 by way of a path 138, AAU control circuit 154 and delay circuit 155.

When the register set instruction preempts the writing of an address register, the information for selecting the address register is applied from register XSR through the decoder 157 and bus 137 to the address register set 141. Simultaneously from the register XSR, information is applied through decoder 157 and bus 137 for selecting information on bus 160 in lieu of information on bus 137.

The address arithmetic section 124 transmits addresses by way of the address bus latch 145 for accessing locations in memories 100 and 105, generates new addresses in the adder 147 and sets the address registers RX, RY, RD and PC.

Referring now to FIG. 4, the diagram shows that addresses are transmitted to memory as a series of four addresses being transmitted during each processor cycle. One of the addresses is transmitted during each of four machine states during each processor cycle. The first address transmitted during the first machine state is the address stored in the program counter register PC. As indicated in FIG. 4, this address is transmitted automatically during the first machine state of each processor cycle. The second address transmitted during the second machine state is the address stored in register RD or in register RX. The third address transmitted during the third machine state is the address stored in register RX or in the program counter register PC. The fourth address transmitted during the fourth machine state is the address stored in register RY.

Each address transmitted by the address arithmetic section is latched in the address bus latch 145 during one of the mentioned machine states of the processor cycle. Also during those machine states, the addresses are incremented in the address arithmetic unit adder 147 by an increment value that is read out of one of the increment registers RI, RJ and RK or in the case of the address from register PC, the address is incremented by +1. These incrementing operations are accomplished during the same machine state that the address is latched.

Identification of the selected address and increment registers is accomplished by applying the appropriate control fields to the instruction register IR-S,T prior to the addressing operation so that the appropriate coding is applied to access circuitry for both the address and the increment registers during the machine state that the address is to be transmitted. Both the address and the value of the increment are read out and are summed by the adder 147. The resulting incremented address is stored in the adder latch 150 while the address is being transmitted from the address bus latch 145.

Coding for identifying whichever address register was selected is transferred through the delay circuit 155 to the decode register circuit 157. Delay and decoding are designed so that the incremented address stored in the adder latch 150 can be written into the address register from which the transmitted address was fetched. Thus the transmitted address is post-modified or post-incremented during the processor cycle when it is transmitted to the memories 100 and 105.

Turning now to FIG. 2, the arithmetic section 110 is organized for pipelined operations. Coefficient words x and variable data words y are operands received from the memories by way of the common data and control bus 101 into coefficient word register 102 and the variable data word register 106. During every machine state 1, one coefficient word x is fetched over the common data and control bus 101 into the coefficient word register 102, as shown in FIG. 4. During every machine state 2, one variable data word y is fetched over the common data and control bus 101 into the variable data word register 106, as shown in FIG. 4. The rounded output words w also are operands for some operations and are stored in the register 118. A new operand is received into each of those registers during every processor cycle of a normal instruction.

The arithmetic section 110 includes three subsections which are independently controllable in response to different control fields l, m and n. During the fetch cycle of an instruction, the fields l, m and n are stored in an instruction register IR-L,M,N. In the next processor cycle, those fields are decoded in a decoder circuit 113 and the result stored in register REG F. During the following processor cycle, this information is transferred to an AU control circuit 114 for supplying control signals to various subsections of the arithmetic section. This latter processor cycle is the execution cycle of the instruction.

Figure 9:
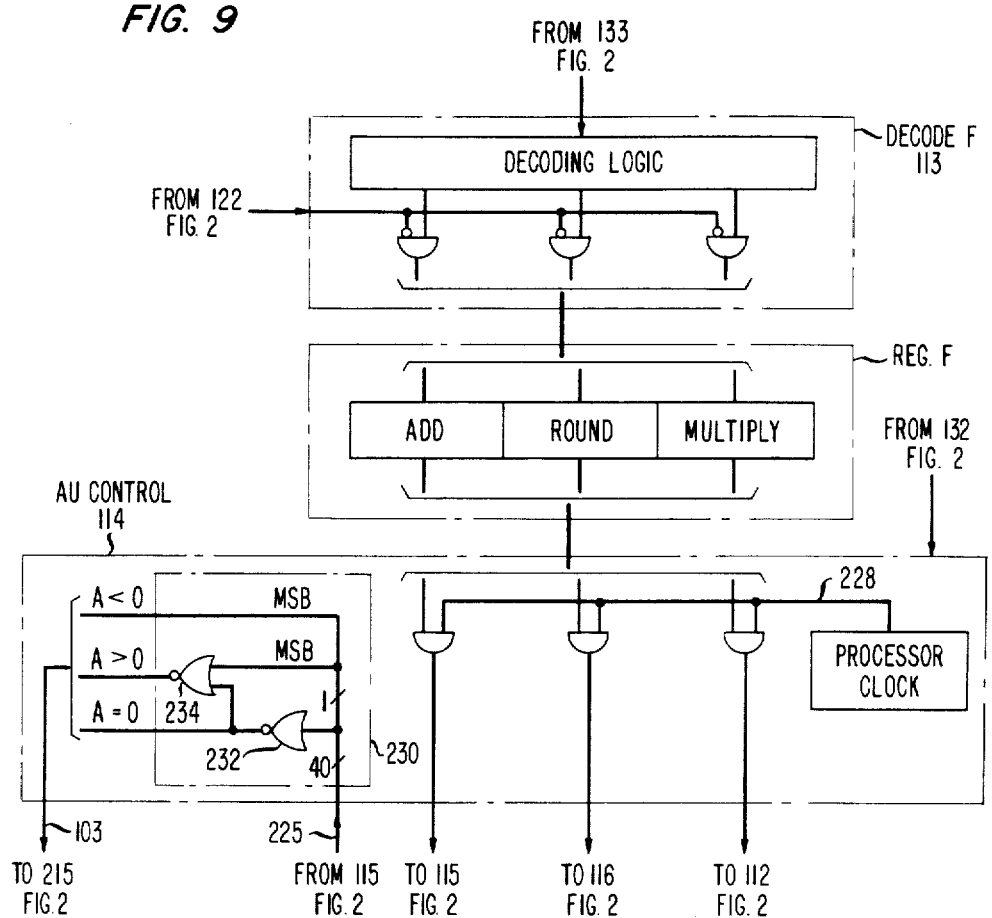
FIG. 9 is a logic diagram of some control circuits.

Referring to FIG. 9, the arrangement of the decoder circuit 113, the register REG F and the AU control circuit 114 is shown therein in greater detail. Decoder circuit 113 is a gated decoding circuit producing three separate outputs. Each of those outputs originates from a decoding logic circuit and can be either a "1" or a "0". Each of those three outputs is applied as an input to a separate AND gate. The other input to each AND gate is a gating signal from the logic circuit 122. This gating signal from circuit 122 is either a "0" for enabling all three AND gates or a "1" for disabling all three AND gates. When the AND gates are enabled as a result of a condition being met during execution of a conditional instruction, the output signals from the decoding logic circuit are gated through the AND gates and are applied to respective memory cells in the register REG F. When the AND gates are disabled as a result of a condition not being met during execution of a conditional instruction or because an unconditional instruction is being executed, the three outputs from the decoding logic circuit are blocked and therefore are not applied to the cells of the register REG F. Thus the AND gates of the decoder circuit 113 are enabled or not depending upon whether a condition, specified by the conditional instruction being executed, is met or not as described subsequently.

Information stored in the three cells of the register REG F is applied to three inputs of the arithmetic control circuit 114. Within the control circuit 114, those three inputs are gated by three AND gates which are enabled once during each processor cycle by a processor clock signal which is applied by way of a lead 228. Outputs of the AND gates are applied respectively to the circuits of the multiplier section 112, to the circuits of the accumulator section 115, and to the circuits of the rounding and overflow section 116. In those sections 112, 115 and 116, the signals "1" enable the circuits of the sections to which they are applied. The signal "0" disables the circuits of the section to which it is applied. Thus the circuits of one section may be disabled at a time when a specified condition is met during execution of the conditional instruction.

The control signals provide information relating to which choices are to be made from processing options available in each of the subsections. The multiplier subsection 112 typically generates a product of two operands during each processor cycle. In a typical multiplication, one operand is the coefficient word x and the second operand is either the variable data word y or the rounded output word w.

All of the outputs from the register REG A of the accumulator section 115 in FIG. 1 are applied through the path 225 to the arithmetic unit control circuit 114, as shown in FIG. 9. For exemplary purposes the path 225 is shown to include forty leads. Within the control circuit 114 flags, or status signals, are generated by a flag circuit 230 which includes NOR gates 232 and 234. The NOR gate 232 has a separate input for each of the 40 outputs of the register REG A in the accumulator section 115. When the register REG A stores all zeros, the output of the NOR gate 232 is a "1" because of its output inversion. This output indicates that the condition of the accumulator section 115 is the contents a equal zero, i.e., a=0. When the most significant bit MSB of the register REG A is a "1", a single lead designated MSB is a "1" indicating that the condition of the accumulator is the contents a are less than zero, i.e., a<0. When the output of the NOR gate 232 is a "0" and the most significant bit MSB is "0", the output of the NOR gate 234 is a "1" indicating that the condition of the accumulator is the contents a are greater than zero, i.e., a>0. Except for the mentioned conditions the lead a<0 and the outputs a=0 and a>0 of the NOR gates are all "0".

Coefficient word x is a 16-bit word. These sixteen bits are taken into the register 102 from the most significant bit lines of the common data and control bus. A selection circuit 162 scans the sixteen bits of the coefficient word, from the least significant bit to the most significant bit, four bits at a time during each of the four machine states in every processor cycle. Another selection circuit 163 concurrently selects either a 20-bit variable data word y or a 20-bit rounded output word w.

Multiplication based on Booth's algorithm is performed. Thus a Booth logic circuit 165 responds to the successive 4-bit nibbles to produce control signals for the generation of partial products.

The output from the Booth logic circuit 165 during every machine state is latched into a register 166. This output is applied to a circuit 168 which produces the the partial products by data selection.

These partial products are accumulated by adding to prior sums and carries. An adder 170 sums the partial products with the prior sum and carry information storing a resulting 36-bit intermediate operand, or product word p, in a product register P. Associated registers S and C respectively store the sum and carry information produced during each processor cycle.

Because the arithmetic section is arranged for pipelined operation, the product register P receives a new intermediate operand, or product word, p during every processor cycle of normal instructions. This product word p is applied by way of a bus 172 as an intermediate operand to the input of the accumulator subsection 115.

In the accumulator subsection, the product word p is added with a 40-bit resultant output word a that may be shifted by a circuit 174 prior to application as an input to an adder circuit 175. The adder circuit 175 produces sum and carry information which is stored in register 177. The sum and carry information is stored in register 177 during every processor cycle. Carries are resolved by carry-look-ahead logic in adder 178. Output from adder 178 is applied to an input of a logic circuit 180 together with the resultant output word a to generate the next subsequent value of the 40-bit resultant output word a to be stored in register A. Such a resultant output word is produced and stored in register A during each processor cycle of a normal instruction.

A portion of the resultant output word a is applied as an input to the rounding and overflow circuit subsection 116 in 10-bit slices. These slices are clocked through rounding circuit 182 and an overflow logic circuit 184 to the 20-bit rounded output register W in three consecutive machine states of each processor cycle. In the fourth machine state, state 3, shown under processor cycles i+1 and i+2 in FIG. 4, the value in the register W may be corrected for overflow if the value in the register A is too large to be represented in the 20-bit register W. Then during state 0 of the next processor cycle, shown in FIG. 4, the rounded output word can be transferred through the common data and control bus 101 to a destination, such as a location in the random access memory 105 where it is stored.

The three subsections (multiplier, accumulator and rounding) of the arithmetic section accomplish their basic operations in one processor cycle each. Outputs of the subsections are stored in registers every processor cycle so that the next subsection in line has a stable input to commence the next subsequent processor cycle.

Control of the arithmetic section 110 and of the address arithmetic section 124 is accomplished by a pipelined stream of instructions applied from the memory 100 through the common data and control bus 101. As previously stated with respect to FIG. 4, a single instruction is read out of memory during state 3 of each processor cycle of operation. Such an instruction includes several instruction fields, or control messages, l, m, n, s and t. Fields l, m and n are transferred through the common bus 101 to the register IR-L, M, N for controlling the subsections of the arithmetic section 110. Fields s and t are transferred through the common bus 101 to the register IR-S,T for controlling selection and incrementation of addresses stored in the registers RX, RY, RD and PC.

A fuller appreciation of the arrangement for and operation by pipelined control of processing may be achieved by the following discussion of a specific example of operation.

NORMAL OPERATION

A complete normal assembly language instruction includes all of the information required to perform a desired arithmetic operation. Assembly language instructions for the digital signal processor are designed to represent the control for access to the memory and the control for operation of the arithmetic subsection and of the address arithmetic subsection. The arithmetic subsection continuously performs multiplication and addition operations. The normal arithmetic section operations are characterized by the following general expressions:

$$x \cdot f(y) + f_a(a) \rightarrow a\{\rightarrow w\}$$

$$x \cdot f(w) + f_a(a) \rightarrow a\{\rightarrow w\},$$

where x is a 16-bit wide coefficient word usually fetched from read only memory. The coefficient word x also could be fetched from random access memory or from an input/output circuit 200 and ordinarily has a value for all arithmetic operations.

y is a 20-bit wide data word normally fetched from random access memory. Such a data word also could be fetched from the input/output circuit 200.

a represents the 40-bit wide contents of an accumulator register A. In the accumulator register A, the least significant thirty-six bits are used to accumulate the product of a 16-bit by 20-bit multiplication. The four most significant bits provide overflow protection for the accumulation operation.

w is a 20-bit wide rounded or truncated output of the accumulator. The least significant bit of the rounded output w corresponds with the bit that is fourteenth from the least significant bit of the contents a of the accumulator. This correspondence of bits is consistent with an assumption that the data word y and the rounded output w are integers and that the coefficient word x usually is restricted within the bounds $-2 \leq x < 2$.

f describes a function of either the data word y or the rounded output w. Such function can be the actual value, the sign, or the absolute value of either one of the variables y or w.

$f_a$ generally describes a function of the contents a of the accumulator, such as a, −a, 0, 2a, etc. The variables x, y, w and p are contained in arithmetic section registers X, Y, W and P, respectively.

The aforementioned general expressions imply that three operations are to be performed by the processor.

(1) One of the products $p = x \cdot f(y)$ or $p = x \cdot f(w)$ is formed and is stored in the product register P located at the output of a multiplier.

(2) An accumulation of a resultant word $a = p + f_a(a)$ is accomplished in the accumulator.

(3) Then if required, the resultant word a of the accumulator is rounded and the rounded output word w is written into the rounded output register W.

Each of these three operations is completed during one processor cycle of the digital signal processor. Typically during the operations, the coefficient word x has a value and a multiplication forms the product p. Also typically during each cycle, all three types of operations are performed concurrently by different subsections of the arithmetic section. For some instructions one or more of the three operations may not occur. The operation performed by one subsection during one processor cycle is a partial evaluation of a different general expression than the expressions concurrently being evaluated in the other subsections.

Assembly language instructions are converted to machine language instructions which are stored in the memory for actually controlling the digital signal processor. Because the operations are dependent upon one another and because all of the operations occur concurrently within the processor, it is important to know at all times what is stored in various registers and what operation is to be performed thereupon.

To avoid confusion regarding which values of the product word p and which values of the contents a of the accumulator are involved in any processor operation, the following order of operations is recommended when writing assembly language expressions representing them.

$$\{w \leftarrow a\} \; a \leftarrow p + f_a(a) \quad \begin{array}{l} p \leftarrow x \cdot f(y) \\ \text{or} \\ p \leftarrow x \cdot f(w) \end{array}$$

Then as the reader proceeds from left to right, the proper values of the product word p and of the contents a of the accumulator are more apparent. The proper values are the results of the last preceding operation which determined those values. Thus the value of the contents a of the accumulator, to be rounded into the rounded output w or to be used in any function $f_a(a)$, is the contents a of the accumulator at the end of the last previous accumulation. Similarly, the value of a product word p to be used in a current accumulation has a value determined in the last previous multiplication operation.

Because of the reasons given in the foregoing discussion of the order of processor operations, it is important that the information contained in the assembly language instruction be presented to the processor in proper order. Information presented in the following order is acceptable to the processor.

(1) A choice of destination is made. The word to be written to the destination is chosen from either the rounded output word w or the data word y. The chosen word can be written into the random access memory or into the input/output circuit. The specific destination of the selected word is given.

(2) As required by the instruction, there is a choice of whether or not to move the resultant word a into the rounded output w.

(3) One accumulation operation is selected from a group of operations having a general expression $a = p + f_a(i\ a)$.

(4) Specify a multiplication operation producing the product $p = x \cdot f(y)$ by indicating the source XSRC of the coefficient word x, the nature of the function f, and the selection of the data word y, together with the source YSRC of the data word y. Alternatively specify a multiplication operation producing the product $p = x \cdot f(w)$ by indicating the source XSRC of the coefficient word x, the nature of the function f, and the selection of the rounded output w rather than the data word y.

The following exceptions apply to the above-mentioned left-to-right rule. When the rounded output w is selected for the multiplication, the value of the rounded output w is the value determined by the last rounding of the resultant word a as performed in a preceding instruction. If data word y is to be written and a source for data word y is specified, the first step in execution of the instruction moves the data from the specified source into the data register Y. Thereafter any writing of this new value for data word y can occur.

The following Table I summarizes the normal assembly language instructions that a programmer would use for preparing an assembly language program. The syntax of a language called C is used as the assembly language which is described in a text entitled, *The C Programming Language* by B. W. Kernighan et al, Prentice-Hall, Inc., 1978. Each complete instruction is formed by choosing four statements, one statement from each column of Table I starting with the lefthand column and working toward the right. In the two leftmost columns, the word NOTHING is listed as a valid choice. When the word NOTHING is selected as a part of a complete instruction, the corresponding space in the instruction is left blank. Every complete assembly language instruction is terminated by a semicolon.

TABLE I

| NORMAL ASSEMBLY LANGUAGE INSTRUCTIONS | | | |
|---|---|---|---|
| NOTHING | NO-THING | a=p | p=XSRC*YSRC |
| DEST=y | | a=p+a | p=XSRC*w |
| DEST=YSRC | w=a | a=p−a | p=XSRC*c |
| DEST=w | | a=p+2*a | p=XSRC*abs(YSRC) |
| | | a=p+8*a | p=XSRC*abs(w) |
| | | a=p+a/2 | p=XSRC*c*sgn(YSRC) |
| | | a=p+a/8 | p=XSRC*c*sgn(w) |
| | | a=p&a | |

In Table I the symbol DEST means a destination statement and is to be replaced in the assembly language instruction by one of the following statements.

DEST

*rd++i
*rd++j
*rd++k
obuf where e.g., *rd++i means that rd, which is the address of the location in random access memory pointed to by the contents of register RD, is post incremented by the contents i of the register RI. Interpretations of different ones of the foregoing destination statements are explained in more detail subsequently.

Also in Table I, the symbol XSRC means a statement for the source of data word x, and the symbol YSRC means a statement for the source of the data word y.

Each of those two symbols in Table I is to be replaced, in any assembly language instruction, by one of the statements in the following two columns:

| XSRC | YSRC |
|---|---|
| x(old x) | *ry++i |
| VALUE (immediate x) | *ry++j |
| *rx++i | *ry++k |
| *rx++j | ibufy |
| *rx++k | |
| *rx | |
| *rx-- | |
| ibufx | |
| *(rom+rx++i) | |
| *(rom+rx++j) | |
| *(rom+rx++k) | |
| &LABEL | |

In the foregoing columns headed XSRC and YSRC, the symbol VALUE represents a number that appears as an argument of an instruction, i.e., the 16-bit word immediately following the opcode in the read only memory. Such argument is addressed by the address stored in the program counter register PC. In other fetches from memory, the coefficient word x is addressed by the contents rx of the register RX. The notation *(rom+rx ... ) is used to indicate that the contents rx of the register RX point to read only memory rather than the random access memory. The symbol &LABEL represents that the value read from memory source x is an address associated with a label in the program. Other expressions presented in the foregoing two columns for the sources of the coefficient word s and the data word y are presented in more detail subsequently.

With respect to forming complete assembly language instructions from the information presented in Table I, some caution is suggested. If the expression DEST=YSRC is desired in an instruction including the expression YSRC from the rightmost column, then the expression DEST=y must be used in place of the expression DEST=YSRC. If the rounded output w is to be used in the rightmost column, the expression DEST=YSRC cannot be selected from the leftmost column. Additionally, NOTHING should be selected from the leftmost column when the assembly language instruction is a normal instruction in which the source of the coefficient word x is located in random access memory.

In the preparation of a program, a programmer will first write out a series of general mathematical expressions or operations desired to be performed. These may take, for example, the form $$x \cdot f(w) + f_a(a) \rightarrow a\{\rightarrow w\}$$

Such a general mathematical expression is translated by the programmer into an assembly language statement which takes the following form:

| s | n | m | l.l |
|---|---|---|---|
| *rd++j=w | w=a | a=p+a | p=*rx++i* *ry++k; | where l means an instruction field for controlling the formation of a product.

m means the instruction field for performing an accumulation.

n means an instruction field for controlling a transfer operation from register A to register W with the required rounding.

s represents an instruction field identifying a write destination. In this example the destination is a memory location specified by the address stored in register RD. That address is post-incremented and the result stored in the register RD.

t means an instruction field to fetch information from an address stored in an address arithmetic unit register, post-increment that address and store it back into that same register.

The next step performed by the programmer is to skew in time the assembly language statement as follows:

| Time  | s        | n     | m     | l,t                  |
|-------|----------|-------|-------|----------------------|
| i     |          |       |       | p=*rx++i* *ry++k;    |
| i+1   |          |       | a=p+a |                      |
| i+2   |          | w=a   |       |                      |
| i+3   | *rd++j=w |       |       |                      |

The resulting skewed assembly language statement, which appears diagonally on the time line of the leftmost column, is stated together with skewed assembly language statements representing other general mathematical operations. When these skewed assembly language statements are stated together, the resulting pieces of different statements which appear in the same row, or during the same interval such as interval i, form an assembly language instruction. In the assembly language instruction, the different pieces of information in the same interval are separate fields of that assembly language instruction. Each of these fields controls a separate subsection of the processor for performing a step in the process of evaluation, as described by a portion of one of the general mathematical expressions.

An assembler program, which runs on a general purpose computer, operates on each assembly language instruction by moving the source fields two processor cycles earlier in the program than the rest of the fields in that same assembly language instruction. This moving of the source fields is done to every assembly language instruction in the program. The resulting time line for the foregoing assembler statement, as skewed by the programmer and the assembler, will appear as follows:

| Time  | s        | t             | n             | m     | l    |
|-------|----------|---------------|---------------|-------|------|
| i−2   |          | x=<br>*rx++1  | y=<br>*ry++k  |       |      |
| i−1   |          |               |               |       |      |
| i     |          |               |               |       | p=<br>x*y |
| i+1   |          |               |               | a=p+a |      |
| i+2   |          |               | w=a           |       |      |
| i+3   | *rd++j=w |               |               |       |      |

Referring now to FIGS. 5 and 6, there is shown a time line diagram indicating how data is processed in the digital signal processor. In general, the diagram presents the flow of data through various subsections of the processor during the evaluation of one general mathematical expression together with parts of other mathematical expressions. Before attempting to describe the operations represented we will first define symbols used throughout the time line diagram of FIGS. 5 and 6.

$I_i$ is a machine language instruction fetched from read only memory during a processor cycle, or interval, i and decoded within the processor during a processor cycle, or interval, $i+1$. In general the instruction $I_i$ affects operation of sections of the processor during a processor cycle, or interval, $i+2$. As previously mentioned each instruction contains the fields, or control messages, l, m, n, s and t.

$I_i(t)$ represents the field t in the machine language instruction $I_i$ for controlling the fetching of operands $x_{i+3}$ and $y_{i+3}$. These fetches take place during the interval $i+3$.

$I_i(l)$ represents the field l in the machine language instruction $I_i$ for controlling the computation of a product, or intermediate operand, $p_{i+2}$ during the interval $i+2$. The product $p_{i+2}$ is a function of the operands $x_{i+1}$ and $y_{i+1}$.

$I_i(m)$ represents the field m in the machine language instruction $I_i$ for controlling the accumulation of output from, or desired resultant word, $a_{i+2}$ during the interval $i+2$. The resultant word $a_{i+2}$ is a function of the last prior resultant word $a_{i+1}$ and a product $p_{i+1}$ previously computed.

$I_i(n)$ is a field n in the machine language instruction for controlling the transfer of a rounded output word $w_{i+2}$ during interval $i+2$. Rounded output $w_{i+2}$ is a function of the last prior rounded output $w_{i+1}$ and the resultant word $a_{i+1}$ of the accumulator.

$I_i(s)$ is a field in the machine language instruction for controlling the storing of the rounded output word $w_{i+1}$ and the modification of register stored addresses $u_{i+2}$ during the interval $i+2$. The modified addresses are a function of the prior address $u_{i+1}$ and field $I_i(s)$. The updated memory state $M_{i+2}$ is a function of the field $I_i(s)$, the prior memory state $M_{i+1}$, register stored addresses $u_{i+1}$ and the rounded output word $w_{i+1}$.

$I_i(s,t)$ is a combination of fields s and t within the machine language instruction. The fields control the modification of register stored addresses $u_{i+2}$ during the interval $i+2$. The modified addresses $u_{i+2}$ are also a function of the address $u_{i+1}$.

$x_i$ and $y_i$ are operands fetched from memory during the interval i, under control of the field t of the instruction $I_{i-3}$ fetched from memory during the interval $i-3$. Instruction $I_{i-3}$ is decoded during interval $i-2$ and controls processing during interval $i-1$ wherein the addresses for operands $x_i y_i$ are produced. As previously mentioned these operands are accessed from memory during interval i. They are processed through the multiplier during the interval $i+1$ under control of the field l of the instruction $I_{i-1}$, which is fetched during the interval $i-1$. This produces the intermediate operand or product $p_{i+1}$.

$p_{i+1}$ represents the product formed by the multiplier during the interval $i+1$. This product is an intermediate operand which is used as an input to the accumulator for its operation during the interval $i+2$. Product $p_{i+1}$ is formed in register P under control of the field $I_{i-1}(l)$. The multiplier and multiplicand are the operands $x_i$ and $y_i$.

$a_{i+2}$ represents the contents of the accumulator during the interval $i+2$. This is the desired resultant word $a_{i+2}$ for the expression being evaluated. The word $a_{i+2}$ is an input for the rounding and output circuit subsection for the interval $i+3$. The rounding operation occurs under the control of the field $I_{i+1}(n)$.

$w_{i+3}$ represents rounded output word w which is available in the register W and which can be stored into writeable memory during the interval i+4 under the control of the field $I_{i+2}(s)$.

In the diagram of FIGS. 5 and 6, there is shown all of the processing activities of various processor subsections of the digital signal processor together with time in processor cycles. each column in the chart represents a different processor cycle, or time interval, of the processor. Information in each column is closely related to some machine language instruction. Each row represents activities of a different processor subsection performing its assigned functions during operation of the digital signal processor.

Since each row of the chart represents a different activity, we shall define those activities. The first row below the processor cycle headings indicates storage activities, i.e., memory fetches and stores. The second row presents the time at which instructions are decoded within the digital signal processor. The third row shows the computing of the product p by the multiplier subsection of the processor. The fourth row presents the accumulating of the resultant word a by the accumulator subsection of the processor. Row five presents activities of the rounding and overflow subsection of the processor, which produces the rounded output word w. The sixth row discloses activities associated with modifying addresses used for fetching data for the arithmetic processes.

The processing of the aforementioned general arithmetic expression can be traced through the various sections and subsections of the digital signal processor by reference to FIGS. 5 and 6.

A first step in the processing of a general arithmetic expression is the fetching of operands for a multiplication. As previously mentioned, information relating to this fetch operation is placed by the assembler program into an interval earlier than the information associated with control of the multiplication operation. As a result of this assembler program function, every machine language instruction includes a control field for a fetch operation that fetches information from memory for processing to be controlled by a subsequent machine language instruction.

As an example of processing an instruction, consider processing a general expression having information relating to fetch operations for its operands included within an instruction fetched during the interval i−3 of FIG. 5. This instruction $I_{i-3}$ is shown in an emphasized box and is labelled with a subscript identifying the instruction as the instruction fetched during interval i−3. Each instruction shown in the processor function chart is similarly designated in accordance with the interval during which the instruction is fetched from memory. Also each instruction, shown in FIGS. 5 and 6, includes several fields of control information. Those fields l, m, n, s and t are shown in parentheses associated with the instruction in the first row representing the fetching and storing operations. A separate field or separate fields of an instruction are shown in other rows of the chart, e.g., $I_i(l)$ in the row for computing products and $I_i(s,t)$ in the row for modifying addresses.

During the interval i−2, the just fetched instruction $I_{i-3}$ is decoded by the processor, as shown in the emphasized box in the second row representing the decoding of instructions.

A fetch operation for the operands x and y, identified by the instruction $I_{i-3}$, begins during the interval i−1.

The fetch operation begins using an address specified in the instruction field $I_{i-3}(t)$. When that address is used, it is modified and stored back in the address arithmetic section as a function of the instruction field $I_{i-3}(s,t)$ and the prior state $u_{i-2}$ of the registers in the address arithmetic section. This modification of addresses is shown in the emphasized box under the interval i−1. Fetch of those operands x and y is concluded during interval i when the specific operands $x_i$ and $y_i$, identified by the instruction $I_{i-3}$, are read out of memory and are transferred by way of the common data and control bus respectively to registers REG X and REG Y. These fetch operations are shown in the emphasized box under the interval i. The operand $x_i$ typically is read out of read only memory, and operand $y_i$ typically is read out of random access memory.

The address pointers, or the addresses stored in registers RX and RY, which were updated in the prior interval i−1 are used for accessing the operands from memory during the interval i.

The first arithmetic operation to be performed on the operands $x_i$ and $y_i$ occurs during interval i+1. At this time the multiplier subsection responds to the instruction field $I_{i-1}(l)$ for computing an intermediate operand, or product, $p_{i+1}$, as shown in the emphasized box under interval i+1. Such product $p_{i+1}$ is shown as a function of the operands $x_i$ and $y_i$ and of the instruction field $I_{i-1}(l)$.

Instruction $I_{i-1}$, which includes the field $I_{i-1}(l)$, is fetched from memory during the interval i−1, is decoded during interval i and controls sections of the processor during interval i+1.

The next step in evaluating the general expression is processed in the accumulator during interval i+2. This is shown in FIG. 6 in the fourth row representing the accumulation of the resultant word a in an emphasized box under the column designated interval i+2. A resultant word $a_{i+2}$ is shown to be a function of the prior resultant word $a_{i+1}$ stored in the accumulator, of the just described intermediate operand, or product, $P_{i+1}$ and of the instruction field $I_i(m)$.

If specified by the programmer and after the result is accumulated during interval i+2, that result is rounded and is stored in the rounded output register W. This rounding operation is shown under the interval i+3 in an emphasized box in the fifth row representing rounding of the output. The specific rounding operation occurs during interval i+3 where the rounded output $w_{i+3}$ is shown as a function of the last prior rounded output $w_{i+2}$ of the rounded output register W, the just described resultant word $a_{i+2}$ of the accumulator, and of the instruction field $I_{i+1}(n)$.

A final step in processing the general expression is a writing of the rounded output $w_{i+3}$ into memory during interval i+4. This is shown in the emphasized box in the first row of the chart under the interval i+4. Writing a new memory state $M_{i+4}$ is a function of the memory state $M_{i+3}$ for interval i+3 of the last prior address register state $u_{i+3}$, of the last rounded output $w_{i+3}$ just described, and of the instruction field $I_{i+2}(s)$ which was fetched during interval i+2 and decoded during interval i+3.

Rounded output $w_{i+3}$ contained in the rounded output register at the end of interval i+3 is transferred by way of the common data and control bus either to the random access memory or to a buffer in the input/output circuitry during interval i+4.

At the same time that the memory write operation occurs during interval i+4, the address arithmetic section registers are updated based on information in the instruction fetched during interval i+2. The information used is included in the fields $I_{i+2}(s,t)$ of the instruction $I_{i+2}$ that is fetched during interval i+2 and is decoded during interval i+3.

During the interval i+2, it is noted that the instruction $I_i$ which was fetched during interval i controls the multiplier subsection, the accumulator subsection and the rounding overflow subsection of the arithmetic section. This results from the instruction $I_i$ being fetched in interval i, decoded in interval i+1 and used for control during interval i+2. No parts of the instruction $I_i$ remain for controlling subsections of the arithmetic section during subsequent intervals, as in prior pipelined control arrangements. Most of the column representing interval i+2 is emphasized with heavy lines so that the reader readily can find several fields of the instruction $I_i$ for controlling subsections of the arithmetic section during interval i+2.

Operands for the multiplier operation were fetched during the interval i+1 which follows interval i. The resulting product $p_{i+2}$ is formed during the next interval i+2.

A resultant word $a_{i+2}$ which is formed during that same interval i+2 is a function of an earlier resultant word $a_{i+1}$ and an earlier product $p_{i+1}$. This resultant word $a_{i+2}$ is a resultant word evaluated for a different general expression than the general expression being evaluated by forming the product $p_{i+2}$. This concept can perhaps be better understood by the realization that the emphasized boxes forming a diagonal from the top of the column designated processor cycle i down to the fifth row in the column designated processor cycle i+3 relate to the evaluation of one general expression. A similar diagonal, shifted one interval to the right in each column, relates to the evaluation of another different general expression.

Typically in a signal processing program, instructions are executed, in sequence, up to a point where the program counter PC is set to the address value in the program store which is the location of the instruction of the beginning of the sequence. Thus the program will operate continuously in a loop executing the same sequence of instructions repeatedly. Furthermore, fixed data words will be stored at memory locations where addresses are interleaved with locations of instructions in the program sequence. In this way, as shown in FIG. 4, the address in the program counter register PC is used to address a fixed data word during state 2 of processor cycle i+1. The program counter then is incremented by the fixed increment +1 and is used to address an instruction $I_{i+2}$ during state 0 of processor cycle i+2. Again the program counter is incremented by the fixed increment +1 and is used to address the next fixed data word during state 2 of processor cycle i+2. Continuing, the program counter is incremented by +1 and is used to address instruction $I_{i+3}$ in state 0 of the processor cycle i+3 and so on until the end of the instruction sequence. At that time the program counter is set, by an auxiliary register set instruction, to the address of the first instruction in the sequence.

To this point in the description, only routine normal operations of the digital signal processor have been mentioned. Other operations, such as conditional operations, can be performed by the pipelined digital signal processor.

CONDITIONAL OPERATION

In many cases, the algorithm, realized by the condition test and execution of alternative operations that are dependent upon the outcome of the test, may be realized as well by a sequence of one or more instructions that either is executed or is not executed. If this sequence is short, the overall savings in processing time may be large when compared with using the conditional program transfer technique of the prior art for achieving the same result. We have discovered that conditional operations occurring in digital signal processing frequently can be realized with the use of a sequence of one or more instructions that either is executed or not. Therefore the digital signal processor has been designed to process efficiently conditional operations in this manner. The concept used, however, has wider applicability to digital processors generally.

For example consider the problem of finding the maximum value of a sequence of samples stored in memory. The value of each sample in the sequence can be compared with the value of a word in another location by using the conventional conditional transfer approach requiring alternative sequential processing paths.

$$\text{if } (x > x_{max})$$
$$x_{max} = x;$$
$$\text{else}$$
$$/\text{*do nothing*/}$$

such that the statement $x_{max}=x;$ is bypassed or branched around by conditional change of the program counter contents. In our digital signal processor, the instruction $x_{max}=x$ is processed (i.e., fetched and decoded) in sequence independent of the test with the actual transfer of data to $x_{max}$ being inhibited if the test fails.

A conditional instruction causes the processor to perform a condition test operation which is a non-arithmetic auxiliary operation. As in normal arithmetic operations described previously, there is a proper order for writing an assembly language instruction for conditional operations. The following is presented in the proper order.

(1) A choice of destination is made. The word to be written to the destination is chosen from either the rounded output word w or the data word y. The chosen word can be written into the random access memory or into the input/output circuit. The specific destination of the selected word is given.

(2) Specify the condition to be tested and the processor operation to be performed if the test is successful.

The following table summarizes the conditional instructions which are formed by choosing one statement from each of two columns.

TABLE II

| CONDITIONAL INSTRUCTIONS | |
|---|---|
| NOTHING | if (CONDITION) doset ( ) |
| DEST = YSRC | if (CONDITION) doau ( ) |
| DEST = w | if (CONDITION) dowt ( ) |

Meanings for DEST and YSRC are the same as those applicable in TABLE I. The term CONDITION should be replaced by one of the following:

| CONDITION | Description |
| --- | --- |
| a = = 0 | Accumulator contents a equals zero. |
| a > 0 | Accumulator contents a is greater than zero. |
| a < 0 | Accumulator contents a is less than zero. |

Each conditional instruction is assembled as a 16-bit opcode word followed by a 16-bit argument. The format for a conditional instruction is

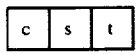

where c, s and t are control fields, as in the normal arithmetic instructions. Fields s and t have the same meaning. Control field c provides control information for the conditional operation. That information includes what operation is to be performed together with the condition to be tested.

There are three choices of operations provided. A processor address or increment register is set if the specified condition is true. Secondly, the next arithmetic section operation is performed if the condition is true. The third choice is that the next write operation is performed if the condition is true. For every conditional instruction, the mentioned operations do not occur if the condition is false. Other operations of each conditional instruction occur whether or not the condition is false.

Operations which are subject to the condition test are the operations specified in the instruction next following the conditional instruction in the pipeline.

Each conditional instruction processed by the digital signal processor is fetched from the read only memory 100 and is transferred over the data bus to the instruction registers. The control fields s and t are stored in the instruction register IR-S,T as previously described. Control field c is stored in instruction register IR-C and in instruction register IR-L,M,N.

By reference to FIG. 8, the operation of the arrangement of FIGS. 1 and 2 will be described performing a conditional operation. Most of the conditional operation occurs much like a routine normal operation. Therefore emphasis will be placed upon those portions of the operation which differ from a routine normal operation. The reader is referred back to the preceding descriptive material for completeness.

In FIG. 8, there is shown a conditional instruction $I_i(c,s,t)$ that is fetched during processor cycle i and is decoded in processor cycle i+1. In this example the conditional instruction $I_i(c,s,t)$ is positioned in the pipeline to affect a normal arithmetic instruction $i_{i+1}(l,m,n,s,t)$ which is fetched during processor cycle i+1, decoded during processor cycle i+2 and is conditionally executed during processor cycle i+3.

Fields s and t of instruction $I_i(c,s,t)$ control data fetches and a write operation during the interval i+2. The state $u_{i+2}$ of the registers in the address arithmetic section is updated during interval i+2 as a function of the control fields $I_i(s,t)$ and of the prior state $u_{i+1}$ of those registers. A write memory operation $M_{i+2}$ that occurs durin cycle i+2 is similar to the operation previously described with respect to the normal arithmetic instruction. Because the conditional instruction is an auxiliary instruction, the arithmetic section 110 is idled during interval i+2 which is the usual execution cycle for this instruction. Therefore multiplier register P, accumulator register A and rounded output register W retain their respective data from the last prior cycle. Intermediate operand $p_{i+2}$ equals $p_{i+1}$, resultant $a_{i+2}$ equals $a_{i+1}$ and the rounded output word $w_{i+2}$ equals $w_{i+1}$.

Control field $I_i(c)$ which is stored in the instruction register IR-C during interval i includes one part identifying what condition is to be tested and a second part identifying what operation is to be controlled in dependence upon the test outcome of the condition. During interval i+1, the two parts of the control field $I_i(c)$ are decoded in circuits 211 and 212 and are stored in registers 213 and 214, respectively.

During interval i+2, the first decoded part of control field $I_i(c)$ that is stored in registers 213 is applied to a comparator 215 establishing what condition is being tested. Simultaneously, the status of conditions, or flags, $V_{i+2}$ from the arithmetic section control 114 are applied by way of lead 103 to the comparator 215. Thus the status of the conditions of the arithmetic section are tested. Comparator 215 produces a condition true or a condition false signal on lead 221 through which the resulting signal is applied as a conditional control on logic circuit 122.

Also during interval i+2, the second part of control field $I_i(c)$ that is stored in register 214 is applied to the logic circuit 122 for generating further control signals. The logic circuit 122 which is enabled or disabled under the control of the conditional signal on lead 221 produces the further control signals that are dispersed to the circuit DECODE F, the address arithmetic section control 154, the random access memory 105 and the input/output circuit 200.

Figure 10:
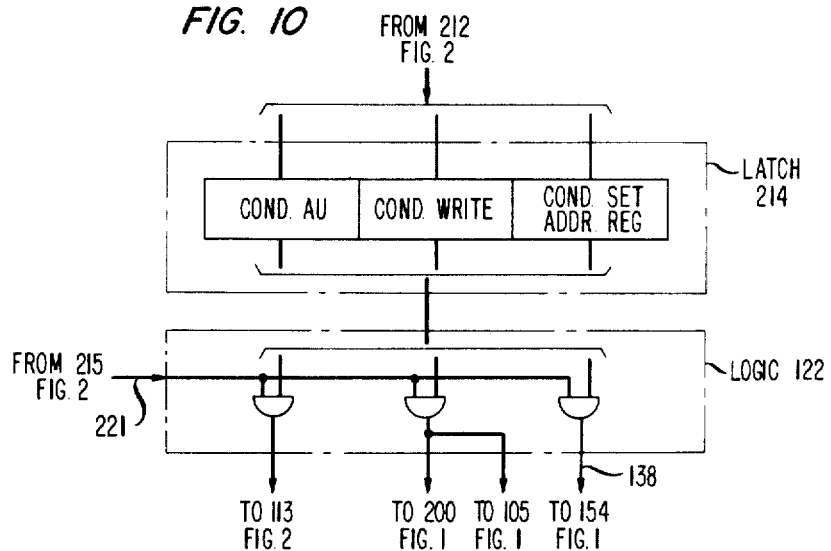
FIG. 10 is a logic diagram of other control circuits.

Referring to FIG. 10, the foregoing is shown in greater detail. The latch circuit 214 includes three cells, or stages, for storing three bits of information from the decoding circuit 212. The bits determine, respectively, whether a conditional arithmetic unit operation, a conditional write operation or a conditional set an address register operation is to be accomplished by a conditional instruction. Only one of these three bits is a "1" for any conditional instruction. Logic circuit 122 includes three AND gates for gating outputs from the latch circuit 214 to the various other circuits in FIGS. 1 and 2 as indicated. A gating signal for the three AND gates is applied from the comparator circuit 215 of FIG. 2 by way of lead 221. The result of the conditional operation is held at the output of the logic circuit 122 for enabling or disabling the various sections of the processor during interval i+3.

Normal arithmetic instruction $I_{i+1}(l,m,n,s,t)$, which is to be affected by the conditional instruction $I_i(c,s,t)$, is fetched during interval i+1 and is decoded during the cycle i+2. Without the preceding conditional instruction this instruction would control the processor during interval i+3. Data fetches for interval i+3 occur as usual.

Thereafter during interval i+3, operations executed depend upon the usual operands together with the state of the control lines from the logic circuit 122, which are conditioned upon the outcome of the comparison made during interval i+2.

When the conditional instruction $I_i(c,s,t)$ is a conditional arithmetic section execute, only arithmetic unit operations are conditionally executed during the interval i+3. Writing memory is not inhibited at this time. If the condition is true for the conditional arithmetic section execute instruction, a new product $p_{i+3}$, resultant word $a_{i+3}$ and rounded output word $w_{i+3}$ are produced. If the condition is false, control of the arithmetic section is disabled and no new product, resultant word or rounded output word is formed. The registers P, A and W retain values from the last prior interval. All other normal processor operations occur during interval i+3.

If the conditional instruction $I_i(c,s,t)$ is a conditional write instruction, only the memory write and output write operations are affected during interval i+3. Operations of the arithmetic section are not inhibited. If the condition is true for the conditional write instruction, the memory write operation $M_{i+3}$ or output write operation occurs. If the condition is false, control of the write operation is disabled and the memory retains its state $M_{i+2}$ from the prior interval. Writing to memory or output is controlled by control field $I_i$, as discussed previously for normal instructions. Whether the condition is true or false, all other processor operations occur normally during interval i+3.

If the conditional instruction $I_i(c,s,t)$ is a conditional register set instruction, only a register set operation is affected during interval i+3. Note that in this case, since the register set instruction is an auxiliary instruction, there will be no activity in the arithmetic section. Memory or output write may proceed without interference as specified by control field $I_i(s)$. If the condition is true, the register designated by the register select field of the fixed data word, associated with the register set instruction, is loaded with the value in the value field of that data word, as explained previously. If the condition is false, control of the register set operation is disabled and the register contents are not changed by the register set instruction.

The foregoing is a description of the arrangement and operation of an embodiment of the invention. The scope of the invention is considered to include that embodiment together with others obvious to those skilled in the art.

What is claimed is:

1. A digital processor arranged for pipelined data processing operations wherein a data word is processed arithmetically into a resultant data word and a status signal during each processor cycle, the resultant data word being written to a destination; the digital processor comprising a plurality of processor sections, including at least an arithmetic, a set register and a write memory section, each processor section being arranged to process one data word while the other processor sections concurrently are processing different data words during every processor cycle;

source means for providing a sequence of conditional and unconditional opcode words, a different opcode word controlling processing every processor cycle, each opcode word including a plurality of control fields, a conditional opcode word being designated $I_i(c,s,t)$ and an unconditional opcode word being designated $I_{i+1}(l,m, \ldots s,t)$, where i=0,1,2, ... represents consecutive processor cycles and (i+1), (i+2) ... represents a consecutive sequence of processor cycles, $I_i(c)$ is a conditional control field, $I_i(s,t)$ are control fields, $I_{i+1}(l)$ is an unconditional multiplier control field and $I_{i+1}(m)$ is an unconditional accumulator control field, each unconditional control field designated (i+1) including information for determining concurrent steps in processing a selected expression of an operand $y_{i+2}$;

means (IR-C, IR-S,T, 211, 212, 213, 214, 215, 122 and DECODE F) for decoding the conditional opcode word $I_i(c,s,t)$ during a first processor cycle (i+1) of the consecutive sequence of processor cycles and the unconditional opcode word $I_{i+1}(l,m, \ldots s,t)$ during a second and next consecutive processor cycle (i+2) of the consecutive sequence of processor cycles;

means for receiving and storing an operand $y_{i+2}$ during the second processor cycle of the consecutive sequence of processor cycles; and means for executing in the arithmetic, set register and write memory processor sections the processing defined by the unconditional opcode word $I_{i+1}(l,m, \ldots s,t)$ during a third processor cycle (i+3) of the consecutive sequence of processor cycles except for the arithmetic section, which is responsive to some of the decoded fields $I_{i+1}(l,m, \ldots s,t)$ during the third processor cycle for processing the operand $y_{i+2}$ during the third processor cycle if the condition defined by the conditional control field $I_i(c)$ is met by the status signal and is disabled for processing the operand $y_{i+2}$ during the third processor cycle if the condition defined by the conditional control field $I_i(c)$ is not met by the status signal.

2. A digital processor arranged for pipelined data processing operations wherein a data word is processed arithmetically into a resultant data word and a status signal during each processor cycle, the resultant data word being written to a destination; the digital processor comprising a plurality of processor sections, including at least an arithmetic, a set register and a write memory sections, each processor section being arranged to process one data word while the other processor section concurrently are processing different data words during every processor cycle;

a register;

source means for providing a sequence of conditional and unconditional opcode words, a different opcode word controlling processing every processor cycle, each opcode word including a plurality of control fields, a conditional opcode word being designated $I_i(c,s,t)$ and an auxiliary opcode word being designated $I_{i+1}(c,s,t)$, where i=0,1,2 ... represents consecutive processor cycles and (i+1), (i+2) ... represents a consecutive sequence of processor cycles, $I_i(c)$ is a conditional control field, $I_i(s,t)$ are control fields, $I_{i+1}(c)$ is an auxiliary control field including information for setting the register;

means (IR-C, IR-S,T, 211, 212, 213, 214, 215, 122 and 154) for decoding the conditional opcode word $I_i(c,s,t)$ during a first processor cycle (i+1) of the consecutive sequence of processor cycles and the auxiliary opcode word $I_{i+1}(c,s,t)$ during a second and next consecutive processor cycle (i+2) of the consecutive sequence of processor cycles;

means for receiving and storing a register control field (XSR,XSL) during the second processor cycle of the consecutive sequence of processor cycles; and means for executing in the arithmetic, set register and write memory processor sections the processing defined by the auxiliary opcode word $I_{i+1}(c,s,t)$ during a third processor cycle (i+3) of the consecutive sequence of procesor cycles except for the set register processor section, which is responsive to some of the decoded fields $I_{i+1}(c,s,t)$ during the third processor cycle for setting the register during the third processor cycle if the condition defined by the conditional control field $I_i(c)$ is met by the status signal and for not setting the register during the third processor cycle if the condition defined by the conditional control field $I_i(c)$ is not met by the status signal.

3. A digital processor arranged for pipelined data processing operations wherein a data word is processed arithmetically into a resultant data word and a status signal during each processor cycle, the resultant data word being written to a destination; the digital processor comprising a plurality of processor sections, including at least an arithmetic, a set register and a write memory sections, each processor section being arranged to process one data word while the other processor section concurrently are processing different data words during every processor cycle;

source means for providing a sequence of conditional and normal opcode words, a different opcode word controlling processing every processor cycle, each opcode word including a plurality of control fields, a conditional opcode word being designated $I_i(c,s,t)$ and each normal opcode word being designated $I_{i+1}(l,m, \ldots s,t)$, where i=0,1,2, . . . represents consecutive processor cycles and (i+1), (i+2) . . . represents a consecutive sequence of processor cycles, $I_i(c)$ is a conditional control field, $I_i(s,t)$ are control fields, $I_{i+1}(s)$ is a normal control field including information identifying a destination for a resultant data word $w_{i+2}$;

means (IR-C, IR-S,T, 211, 212, 213, 214, 215, 122 and 221) for decoding the conditional opode word $I_i(c,s,t)$ during a first processor cycle (i+1) of the consecutive sequence of processor cycles and the normal opcode word $I_{i+1}(l,m, \ldots s,t)$ during a second and next consecutive processor cycle (i+2) of the consecutive sequence of processor cycles;

means for transferring and writing the resultant data word $w_{i+2}$ during a third processor cycle (i+3) of the consecutive sequence of processor cycles; and means for executing in the arithmetic, set register and write memory processor sections the processing defined by the normal opcode word $I_{i+1}(l,m, \ldots s,t)$ during the third processor cycle (i+3) of the consecutive sequence of processor cycles except for the write memory section, which is responsive to the decoded normal control field $I_{i+1}(s)$ during the third processor cycle for writing the resultant data word $w_{i+2}$ to the destination during the third processor cycle if the condition defined by the conditional control field $I_i(c)$ is met by the status signal and for disabling writing the resultant data word $w_{i+2}$ to the destination during the third processor cycle if the condition defined by the conditional control field $I_i(c)$ is not met by the status signal.

* * * * *